April 22, 1969 G. T. GALUTIA 3,439,566
PRECISION COUNTERSINK TOOL
Filed May 9, 1966
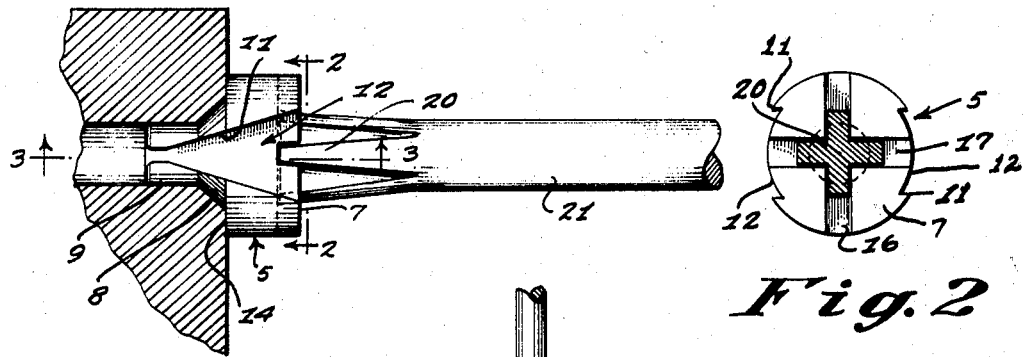
Fig. 1
Fig. 2
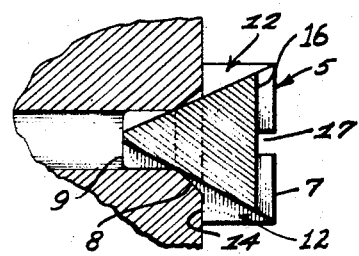
Fig. 3
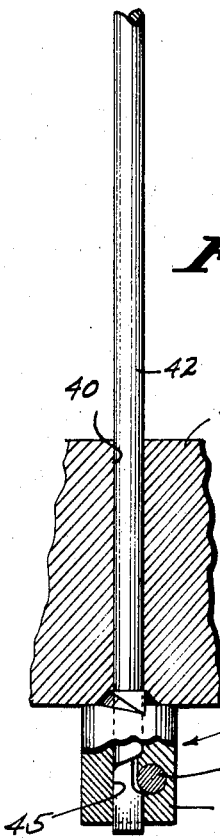
Fig. 8
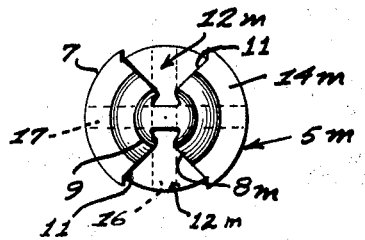
Fig. 4
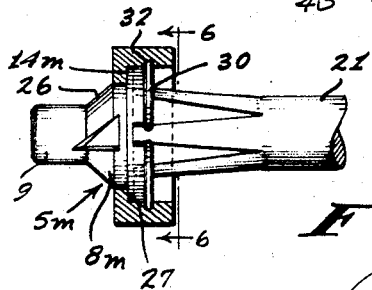
Fig. 5
Fig. 6
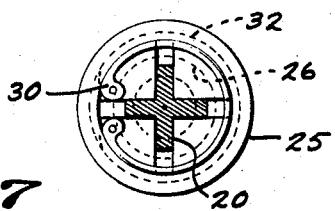
Fig. 7
INVENTOR
GLEN T. GALUTIA
BY
ATTORNEY United States Patent Office 3,439,566
Patented Apr. 22, 1969

3,439,566
PRECISION COUNTERSINK TOOL
Glen T. Galutia, Colorado Springs, Colo.
(22005 29 Court St., Kent, Wash. 98031)
Filed May 9, 1966, Ser. No. 548,688
Int. Cl. B23b 51/10; B27g 15/02
U.S. Cl. 77—73.5     4 Claims

ABSTRACT OF THE DISCLOSURE

A countersink tool having means to stop the cutting of the tool when the desired depth of countersink has been obtained, including an enlarged concentric flange around the body of the countersink bit which acts as a stop when it comes in contact with the workpiece or a bearing plate which may be inserted between the flange and the workpiece.

---

The present invention relates to cutting tools and in particular to a tool used to chamfer or form a flaring depression around the top of a hole in a workpiece. The enlargement of the hole is usually provided to receive the head of a screw or similar fastener in order to make the screw head flush with the surface. It has long been recognized that for work on thin material or for precision machine work a means must be provided to obtain a full depth for the countersink while at the same time limiting the depth to just that necessary to accommodate the fastener; otherwise too much material may be removed from the work and the screw will sink too far or conversely, the screw head will not be flush.

Although the requirement for such means has been recognized and indeed satisfied to a large extent, the complexity of the prior art devices encumbers their usefulness and creates a cost factor which mitigates against their wide application except in the most expensive of machine tools.

It is therefore the object of the present invention to provide a countersink tool having simplified means for limiting the depth of travel into the workpiece.

A second object of the invention is to provide a countersink tool of the type just described which is not dependent for its performance on a rigid shank or driving stem, but on the other hand is usable with a detachable driving shank which can be tilted with respect to the longitudinal axis of the countersink bit if the location of the hole and surrounding structure requires it.

A third object of the invention is to provide a bit of the type described whose driving shank is substantially no larger in diameter than the drill bit used to drill the original hole. The advantages of such small size are apparent upon inspection of the large cumbersome structures of the prior art.

For a detailed description of a preferred and two modified forms of the invention, reference should be made to the accompanying drawings in which:

FIGURE 1 is a side view of the countersink bit and detachable shank therefor with the workpiece being shown in fragmentary cross section.

FIGURE 2 is a cross sectional view taken along lines 2-2 of FIGURE 1.

FIGURE 3 is a cross sectional view taken along lines 3-3 of FIGURE 1.

FIGURE 4 is a plan view of the countersink bit as seen from the bottom thereof.

FIGURE 5 is a side view of the first modified form of the invention which includes a rotatable holder for the countersink bit, the holder being shown in cross section.

FIGURE 6 is a cross sectional view taken along lines 6-6 of FIGURE 5.

FIGURE 7 is a plan view of the first modified form of the invention as seen from the bottom thereof.

FIGURE 8 is a side view of a second modified form of the invention with a fragment of the workpiece shown in cross section and a portion of the countersink tool broken away and shown in cross section.

Referring to FIGURES 1, 2 and 3, the reference numeral 5 generally depicts the preferred form of countersink bit of the present invention. The body of the bit includes a cylindrically shaped head 7 from which depends a frusto-conical portion 8 from which one or more cutting edges are formed. The small end of the cone portion 8 terminates in a reduced diameter pilot shaft 9. The sharpened cutting edges 11 are formed along one side of chip relieving slots 12 which extend the length of the bit, including the cylindrical head 7.

The shape and dimensions of the bit vary with the particular type of countersink desired. The length of the pilot shaft 9 depends on the thickness of the workpiece and the depth of the countersink. It is apparent from an examination of FIGURES 1 and 2 that the flange 14 formed by the periphery of the bottom surface of the cylindrical head 7 functions to limit the depth of travel of the countersink tool into the material. Since the head 7 is provided with chip relief slots 12 the chips and cuttings are free to be expelled from the hole without interference from the flange 14 or head 7. By the particular design and construction of the bit 5 the tool can be arranged for cutting "under" and "over" as well as "flush" countersinks.

Formed at right angles to each other in the top surface of the head 7 are a pair of slots 16 and 17 adapted to receive the fluted end 20 of a rigid drive shank 21. The shank may be rotated by any convenient drive means having a chuck or similar device with which to hold and rotate the shank. It will be apparent that some slant of the shank 21 may be permitted if necessary without effecting the cutting angle of the bit 5 and the precision of the countersink hole. The pilot shaft 9, acting together with the limit flange 14, which is perpendicular to the pilot shaft, will insure a countersink which is symmetric and true with respect to the original hole in spite of the angle of the drive shank 21.

A second embodiment of the invention, as illustrated in FIGURES 4 through 7, is particularly useful where extra precaution must be taken to avoid marking or marring the surface around the countersink. For this purpose a holder 25 is provided which is intended to act as a bearing for the flange 14m of the countersink bit 5m. The holder 25 is cup shaped and has an aperture 26 through which the pilot shaft 9 and cutting portion 8m protrude. The flange 14m of the modified bit 5m rotates against the inside surface of the ledge 27 formed by the bottom of the cup type holder 25, thereby avoiding contact between the rotating flange 14m of the bit and the surface area of the workpiece.

The bit 5m is maintained in the holder 25 by a springable retainer ring 30 disposed in an annular slot 32 located around the inside surface of the holder 25. The modified form of bit may be driven by the same star drive shank 21 as described for the preferred form of the invention.

It is desirable that the chip relief slots 12m in the modified form be cut deeper into the body of the bit to insure adequate chip clearance between the bit itself and the bit holder.

In operation the holder may be hand held, inasmuch as there is very little torque exerted on the holder by the driving force delivered to the drive shank 21. The holder moves downwardly toward the surface of the workpiece as the bit cuts and establishes a depth limit for the countersink as soon as the bottom surface of the holder comes into contact with the surface of the workpiece.

Not infrequently in the course of material working, it is extremely difficult or impossible to position the countersink tool and drive it due to interference from some portion of the structure or other object which is on the same side of the workpiece which is to be countersunk. The basic concept of the present invention, that of providing a tool with self depth regulation of the type already described, lends itself to a third embodiment of the device, as depicted in FIGURE 8, which may be operated from a "blind" side of the work. Such a structure assumes of course that the hole or bore 40 which is to receive the countersink extends through the material 41 of the work piece and that the material is thin enough to accommodate the length of the drive shaft 42.

This modified form of the bit $5m^1$ is similar in all material aspects to the preferred form of bit $5m$ except that the head $7m^1$ is somewhat larger and the entire bit is provided with an axial bore 45 of a diameter sufficient to accommodate the end of the drive shaft 42. A pin or set screw 46 is positioned in the head $7m^1$ transversely thereof and contiguous with the bore 45. The shank 42 is flattened near the end thereof so that the shank can be inserted into the bore 42 past the pin 46; however, when the pin is rotated in the direction of drive, the grooved portion 48 of the shank 42 wedges against the pin 46 causing the tool $5m^1$ to rotate. The wedging action of the shank and pin also prevents the shank 42 from being pulled out of the bit $5m^1$ in order that some tension may be exerted on the shank 42 to facilitate the cutting process. It will be apparent that by using the structure just described a countersink may be made by driving the bit $5m^1$ from the side of the workpiece opposite to that on which it is desired to perform the countersink operation.

The means for securing the shank 42 to the tool $5m^1$ may be varied from that just described in any number of ways known to the art. In fact the shank could well be an extra long pilot shaft integral with the bit. The only disadvantage to the latter construction is the impossibility of getting the shank through the hole 40 in some instances.

Having thus described the several useful and novel features of the precision countersink tool of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:
1. A countersink tool comprising:
    a frustro-conical bit having at least one cutting edge;
    a cylindrical pilot shaft extending from the small end of said bit and coaxial therewith;
    an enlarged body member attached to said bit and disposed adjacent the larger end of said bit, said body member being cylindrical and coaxial with said bit and having a pair of right angle slots disposed in the plane upper surface of said body member, and wherein the diameter of at least a portion of said body member is greater than the largest diameter of the said bit and forms a flange; and
    a continuous chip relief slot formed lengthwise along the said bit and body member.
2. The tool of claim 1 and further including a detachable drive shank adapted to be received in said slots.
3. The tool of claim 1 and further including a circular bearing plate having,
    an aperture therein to receive the bit and body member of said tool,
    upstanding side walls forming a tubular sleeve having an inside diameter of sufficient dimension to receive the said flange.
4. A countersink tool comprising:
    a frustro-conical bit having at least one cutting edge;
    a cylindrical shaft extending from the small end of said bit and coaxial therewith;
    an enlarged body member attached to said bit and disposed adjacent the larger end of said bit, said body member being cylindrical and coaxial with said bit and wherein the diameter of at least a portion of said body member is greater than the largest diameter of the said bit and forms a flange, wherein said bit and head are provided with an axial bore and wherein the said pilot shaft is removably disposed in said bore and further including,
    means carried by said body member for interlocking said shaft in said bore responsive to rotation in only one direction of said shaft; and
    a continuous chip relief slot formed lengthwise along the said bit and body member.

References Cited

FOREIGN PATENTS 577,300 5/1946 Great Britain.
244,106 3/1947 Switzerland.

FRANCIS S. HUSAR, *Primary Examiner*.

U.S. Cl. X.R.

145—123